June 13, 1967  R. A. CYPHERS  3,325,013
AQUATIC TRASH RAKES
Filed Oct. 29, 1963  3 Sheets-Sheet 1
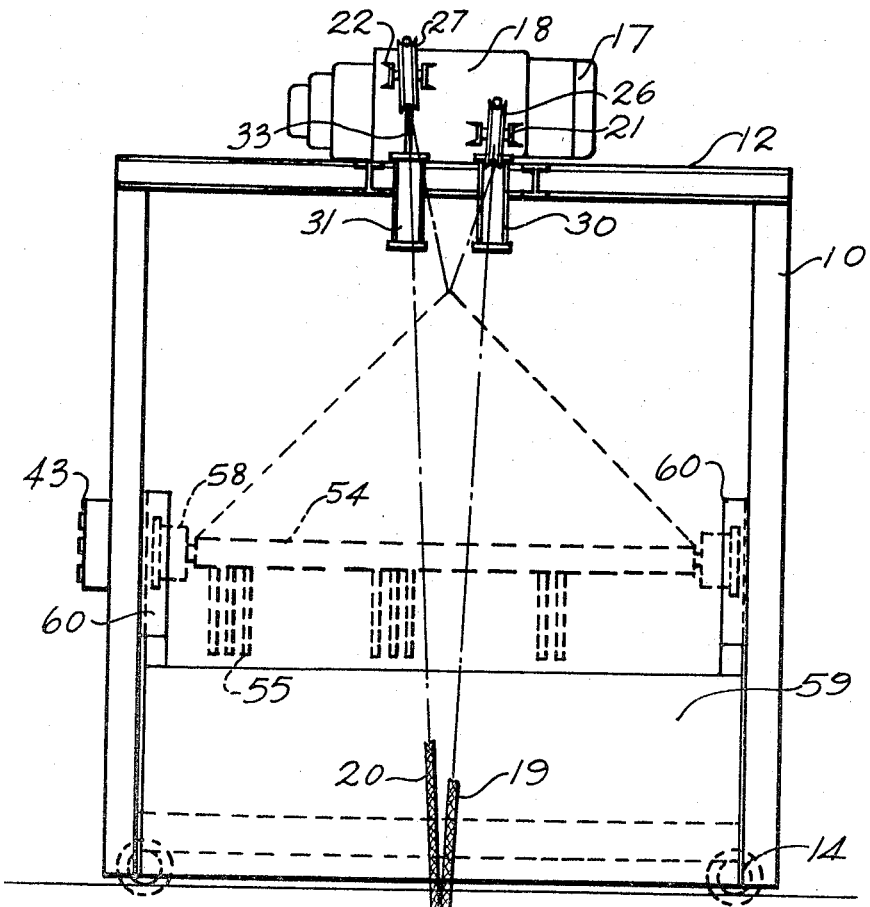
FIG. 1
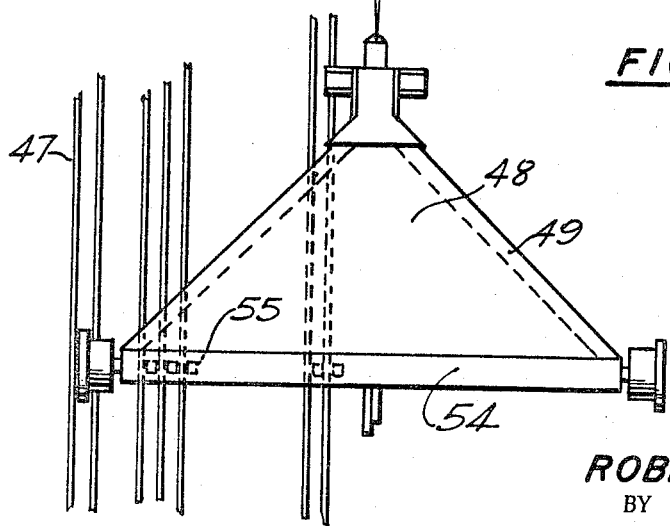
INVENTOR.
ROBERT A. CYPHERS
BY
R. Wilson Corder
ATTORNEY June 13, 1967 R. A. CYPHERS 3,325,013
AQUATIC TRASH RAKES
Filed Oct. 29, 1963 3 Sheets-Sheet 2
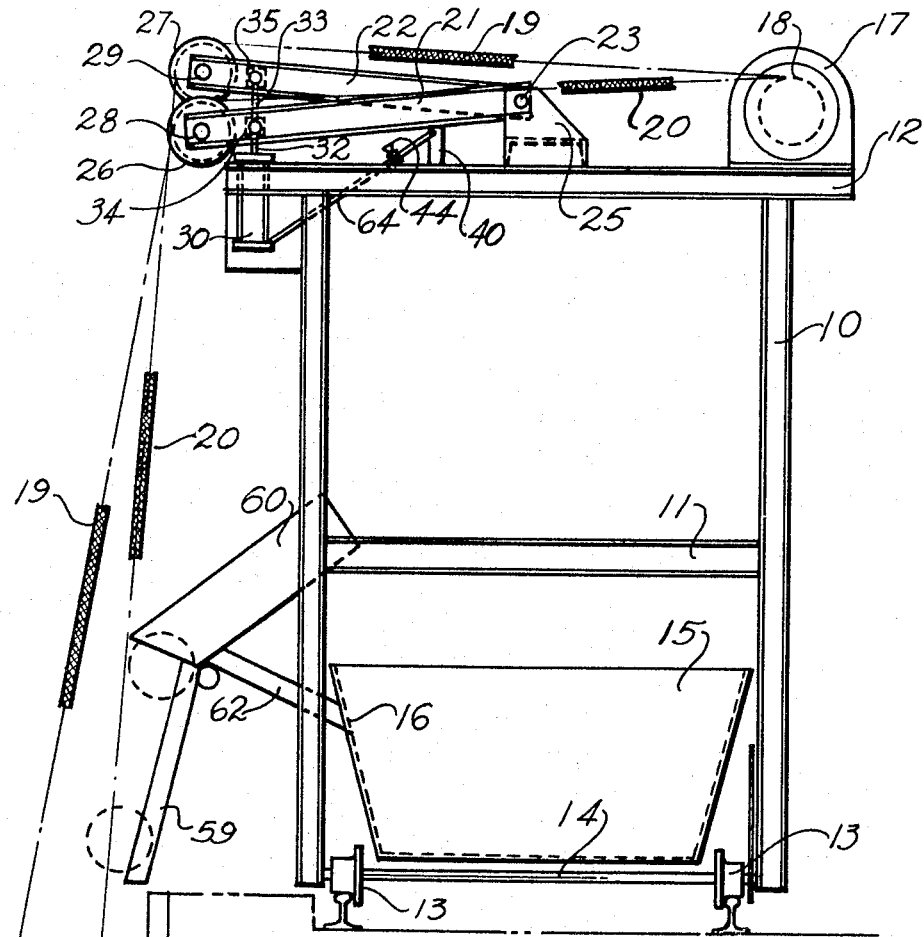
FIG. 2
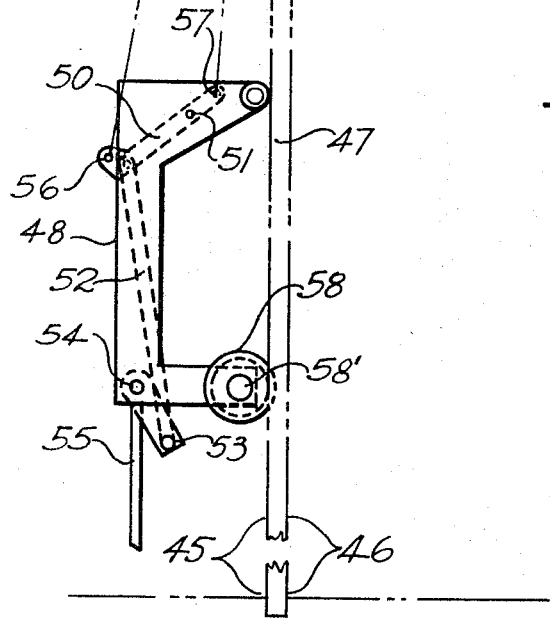
INVENTOR.
ROBERT A. CYPHERS
BY
ATTORNEY

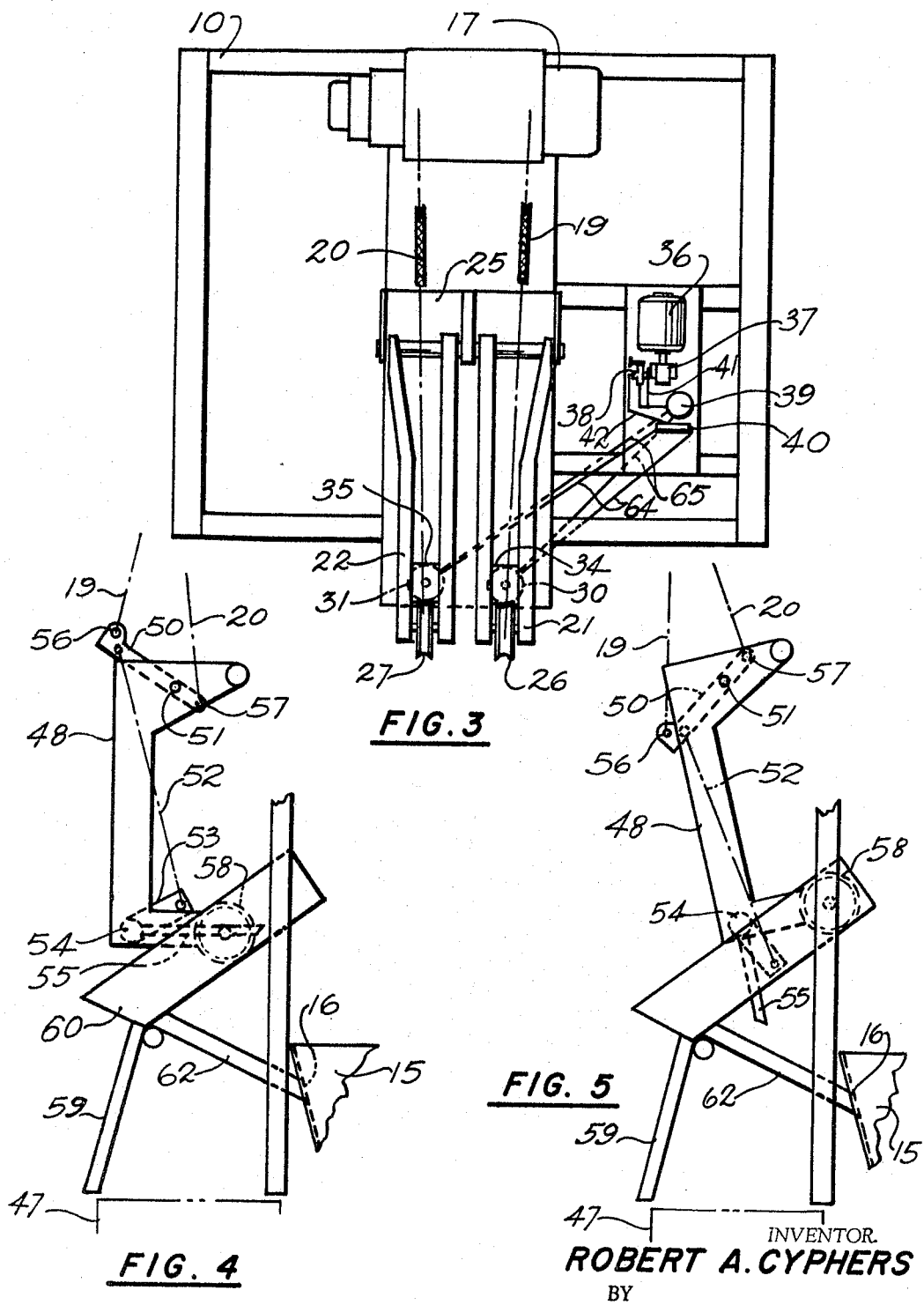

3,325,013
AQUATIC TRASH RAKES
Robert A. Cyphers, 4207 Beverly Lane NE.,
Atlanta, Ga. 30305
Filed Oct. 29, 1963, Ser. No. 319,831
8 Claims. (Cl. 210—159)

This invention relates to refuse or rubbish removing devices, and more particularly, to a new and improved trash rake and associated structures of the type used in the removal of trash and the like accumulating in the intakes of hydroelectric and steam plants commonly used in the generation of electric energy in this country and throughout the world.

Water entering such intakes is commonly impregnated with everything from tree limbs to dead animals and beer cans, which allowed to enter the system would ruin a turbine, or seriously damage other facilities such as those present in a steam plant. To avoid this, a plurality of rack bars are commonly disposed between the incoming water and the mechanisms beyond, but it is apparent that these bars become clogged in the course of time, depending upon the condition of the water, the season of the year, and other factors; and must be cleaned rather frequently if maximum efficiency is to be maintained in the system, even a small blockage in the water intake resulting immediately in a sharply lowered generation of power.

To accomplish this raking function various devices have heretofore been proposed, but such have not been entirely satisfactory for a number of reasons, including multiplicity of parts, initial cost, maintenance problems, and plain inefficiency.

An object of this invention is to provide a trash rake that is simple in structure, economic of operation, and thoroughly adapted to and for its intended purposes.

Another object is to provide such a device that operates on a single drum and with only two cables.

Another object is to provide a rake that may be lowered in a substantially vertical plane behind the trash accumulation adjacent the lower portion of the bars of a water intake, and then have the teeth of the rake moved forwardly to a horizontal or semi-horizontal position in a dipping operation to engage the trash to be removed.

Another object is to provide simple means for raising and lowering the rake assembly.

Another object is to provide facile means for dumping a trash rake once it has accumulated the desired load of refuse.

A still further object is to provide a minimum of moving parts in such a device.

Another object is to provide suitable guides for the vertical movement of the rake assembly during the various phases of its operation.

Another object is to provide a suitable safety means for preventing the over-loading of the assembly during operation with attendant damage thereto or destruction thereof.

Another object is to provide a trash rake and hoist that may be completely automated with very few additions if so desired.

These and other objects made apparent during the further progress of this specification are accomplished by means of the instant invention, a full and complete understanding of which is facilitated by reference to the drawings herein, in which:

FIG. 1 is a front elevational view of subject trash rake in operative position, said view being fragmentary in part;

FIG. 2 is a side view of the structure of FIG. 1;

FIG. 3 is an enlarged top view of the top structure of FIGS. 1 and 2, showing in greater detail the cable raising and lowering mechanism at this point;

FIG. 4 is an enlarged side view of the rake assembly of FIGS. 1 and 2, showing the rake in pre-dumping position; and FIG. 5 is a view similar to that of FIG. 3, in which the teeth of the rake have assumed a semi-vertical position, and dumping of trash is taking place.

Referring now to the drawings, in which identical numerals indicate corresponding parts or elements throughout the various figures thereof, 10 is a supporting framework reinforced as by cross member 11, and having at its top a platform 12; the assembly being mounted on wheels 13 through axles 14, which wheels ride along the top of a dam or like structure above the water intake provided therein, thereby permitting the framework and its component parts to be progressively moved laterally as desired. A dump cart 15 is likewise associated with this assembly, said cart having an aperture or cut-out portion 16 in its side to facilitate the dumping of trash therein, and being susceptible of removal for emptying if and as desired.

Fixedly mounted on platform 12 is a standard hoist 17 having a lower geared limit switch and an upper limit switch, and a single drum 18 secured to which is a pair of live cables 19 and 20. A pair of walking beams 21 and 22 are pivoted as at 23 and 24 to a mounting element 25 provided for this purpose, and idler sheaves 26 and 27 are operatively secured to the ends of the beams as at 28 and 29. Hydraulic walking beam actuating and positioning cylinders 30 and 31 are firmly secured to platform 12, the upper ends of the pistons 32 and 33 of the cylinders being attached to the beams as at 34 and 35.

A hydraulic motor 36 is mounted on the platform in conjunction with hydraulic pump 37, relief valve 38, sump tank 39, double solenoid spring centered control valve 40 (conventional), and pressure and exhaust lines 41 and 42. Push button station 43 from which the various controls are operated is conveniently mounted on framework 10, or otherwise as desired.

As a special safety feature, an over-pressure valve 44 is positioned in a line 15 between hydraulic cylinder 30 to the lower side of its piston, and sump 39, which spring loaded valve and associated elements operates in a manner that will be described hereafter, in the presence of over-load conditions.

Numeral 45 suggests a trash pit at the lower portion of a water intake 46, which is provided with a plurality of continuously spaced vertical or semi-vertical bars 47 for primary screening purposes.

Attention is now directed to trash rake assembly 48 which consists of a somewhat triangular-shaped frame 49 in which is housed a bell-crank 50, pivoted as at 51, the outer end of the crank in turn being pivoted with a link 52 which connects with a lever 53 which is rigidly and fixedly mounted to a rake shaft 54 upon which are secured rake teeth 55, in a desired manner. Cable 19 which operates over sheave 26 in conjunction with hydraulic cylinder 30, is securely anchored to the outer end of 50 as at 56, and cable 20 which operates in conjunction with sheave 27 and cylinder 31 in a similar manner is anchored to said crank as at 57. Wheels 58 which freely turn on shaft 58' at opposite ends thereof ride upon bars 47 and later upon apron 59 and guide channels 60 during a trash raking operation, as will be more fully desribed during the further progress of this specification.

In the operation the instant device works as follows:

Hoist 17 is used to lower the trash rake assembly to its lower limit of travel (FIG. 2) as set by the lower limit switch of the hoist motor, this being predetermined by the requirements and even exigencies of a given installation, teeth 55 being in the open position at the time, generally parallel with bars 47. A push button marked "Close Teeth" is then actuated at station 43, which energizes hydraulic pump motor 36 and the appropriate solenoid of control valve 40 to admit pressure oil to the lower side of the piston of positioning cylinder 30, thereby raising or elevating walking beam 21 and thus effectively shortening cable 19, rotating bell crank 50 clockwise around point 51, and actuating lever 53 and hence rake shaft 54 and associated teeth 55 through link 52.

Simultaneously with the foregoing tooth closing action, which roughly changes the position of said teeth from a vertical to a horizontal plane, valve 40 admits pressure oil to the upper side of the piston of positioning cylinder 31, thereby lowering walking beam 22 with its associated sheave 27 and hence cable 20, the lengthening of which results in a slight lowering of the rake assembly concurrent with the closing of the teeth by virtue of the couple generated about point 51 by the relative movement of the crank at points 56 and 57. At the final lowering of the rake assembly, a sort of dipping action is in progress, comparable to the "claim bucket" action well known in engineering circles; and at the limit of rake shaft rotation, and hence movement of the teeth, they are positioned to penetrate to a desired amount between rack bars 47, or other adjustments are possible.

When the teeth are closed, the button governing this operation (supra) is released, which de-energizes the hydraulic pump motor and control valve solenoids, thus locking control valve oil in both cylinders. A "raise" push button at station 43 is now depressed, which serves to actuate the hoist motor and drum and wind cables 19 and 20 equally around said drum and thereby elevate the trash rake assembly, the wheels 58 of which ride upon the rack bars until reaching the top thereof, and then upon apron 59 and guide channels 60 which in turn force the rake assembly into the upper portion of the carriage adjacent to a chute 61, preparatory to dumping (FIGS. 4, and 5). The upper limit switch of the hoist breaks the motor circuit at this point, thereby stopping the rake at the desired position, and avoiding damage to the machine which would occur if the hoist continued to elevate.

When the position just indicated has been reached, a control button marked "Open Teeth" is depressed at station 43, which again actuates the hydraulic pump motor 36 and pump 37 as well as control valve 40, which admits oil to the lower side of the piston of cylinder 31 and thus raises walking beam 22 and sheave 27, and simultaneously admits pressure oil to the upper side of cylinder 30 for lowering walking beam 21 and sheave 26; this rotating bell-crank 50 counterclockwise, or in a direction opposite to that described heretofore, which serves to elevate the rake assembly to a point approximating that shown in FIGURE 5 of the drawings and simultaneously opening teeth 55, thereby releasing accumulated debris into chute 62 and thence into cart 15 for ultimate disposition.

Over-pressure spring loaded relief valve 44, located between the lower portion of cylinder 30 and the solenoid control valve, provides a practical and useful safety feature herein, said relief valve being set higher than normal operating pressures so that if an over-load occurs on the teeth, such will be transmitted through the cables to idler sheave 26 and thence to cylinder 30, thus creating an over-pressure in the supply line which will open valve 44 to sump as required until normal operating pressures are restored; the teeth being free to rotate in a reverse direction and without damage during such over-load period.

While one form of the instant invention has been disclosed and described in considerable detail herein, it is apparent that no limitation is intended or implied thereby; certain modifications, changes, additions, omissions, reconstructions and the like suggesting themselves; and which may be resorted to without departing from the appended claims, which are to be accorded a construction and scope fairly in keeping with the contribution to the art.

I claim:
1. In a device of the character described, in combination, a supporting framework, a hoist mounted thereon having a revolving drum and upper and lower limit switches, a pair of live cables mounted on said drum, a pair of walking beams pivotally mounted to said framework adjacent the hoist, idler sheaves at the ends of said beams remote from the hoist carrying the cables separately, a pair of hydraulic cylinders disposed beneath said walking beams in pivotal relationship thereto, control means for the cylinders and the hoist; a trash rake assembly including a support, a bell-crank pivotally mounted thereon, a rake shaft operatively disposed at the lower end of said support, teeth on said shaft, an operating lever rigidly secured to the shaft, a link connecting the bell-crank at one end with said lever at the other, the cables being connected to said crank at opposite ends thereof, whereby when one of the cables is shortened by its associated walking beam and sheave being forced upwardly by the action of a hydraulic cylinder, said bell-crank and connecting linkage causing the rake to pivot from a position in which the teeth are substantially vertical to one in which the teeth are horizontal and ready for a trash raking operation between the vertical bars of a hydraulic intake.

2. The device of claim 1 in which the control means for the hydraulic cylinders include a motor, a hydraulic pump connected to said motor, inlet and outlet conduits connected to said pump, a relief valve connected to said outlet conduit, a double solenoid spring centered control valve connected to said outlet conduit, and a push-button station from which said motor and control valve are operated.

3. The device of claim 1 in which said control means includes a sump, a pump having its inlet communicating with said sump, a pressure line extending from said pump to said hydraulic cylinders, a control valve disposed in said pressure line and an over-pressure valve disposed in the pressure line, said over-pressure valve being set higher than the normal pressures that occur in the operative system, whereby when an overload occurs in the rake area, such is transmitted by a cable to the cylinder and creates an over-pressure in the pressure line causing the over-pressure valve to open to sump until normal operating pressures return, thus allowing the rake to rotate backwardly or clockwise and prevent damage to the machine.

4. The device of claim 1 in which the supporting framework is provided with a side apron, guide channels above said apron, and a delivery chute to facilitate the vertical movement of the trash rake assembly after such has passed beyond the screening bars of the hydraulic intake and the dumping of debris from the rake.

5. The device of claim 1 being further constructed and arranged so that the initial phases of a raking operation as the rake teeth are assuming a horizontal plane, the rake assembly is caused to dip downwardly slightly by the bell-crank and its associated element, thereby generating a "clam-bucket" movement at this point at this time.

6. In a device of the character described, in combination, a supporting framework, a hoist mounted thereon and including a revolving drum and a pair of cables wound thereabout, a pair of walking beans pivotally mounted to said framework adjacent said hoist, an idler sheave positioned at the end of each of said beans remote from the hoist and each carrying one of said cables, hydraulic means for alternately raising and lowering said walking beams in unison, a trash rake assembly including a support, a bell-crank pivotally mounted thereon, a rake shaft operatively mounted at the lower end of said support, teeth on said shaft, an operating lever fixedly secured to the shaft, a link pivotally connecting one end of the bell-crank with said lever, said cables being connected to the bell-crank at opposite ends thereof, whereby when one of the cables is shortened by its walking beam and associated sheave being forced upwardly, said bell-crank and connecting linkage causes the rake to pivot from a position in which the teeth are substantially vertical to one in which they are substantially horizontal preparatory to a trash taking operation adjacent the bars of a hydraulic intake.

7. In a device of the character described, in combination, a supporting framework, a hoist mounted thereon, cables mounted on said hoist, walking beams pivoted to said framework proximate to said hoist, idler sheaves secured to the ends of said beams remote from the hoist for carrying said cables, means for alternately raising and lowering said beams; a trash rake assembly, a bell-crank mounted thereon, a rake shaft pivotally mounted on said assembly, teeth secured to the rake, an operating lever integral with said shaft, linkage connecting the bell-crank at one end with the lever at the other, said cables being connected to opposite ends of the bell-crank, whereby when one of the cables is shortened by its walking beam being raised, such action causes said bell-crank and linkage to pivot the rake into a closed position ready for a trash raking operation, and when the other of the cables is shortened by its walking beam being raised, such action causes said bell-crank and linkage to pivot the rake into an open position.

8. Aquatic trash rake apparatus of the type utilized to remove trash from the inlet of an opening in a dam, said apparatus comprising:
(A) A hoist including:
 (1) a single drum having a pair of cables wound therearound,
 (2) support means provided for each cable, the cable of each support means being received thereon in a lateral direction from said drum and extending in a downward direction therefrom,
 (3) means for raising and lowering said cable support means,
 (4) control means whereby one of said cable support means may be raised while the other cable support means is simultaneously lowered,
(B) A rake support assembly including:
 (1) a crank pivoted inwardly of its ends and connected at its ends to said cables,
 (2) a plurality of teeth operatively connected to said crank,
whereby, when one of said support means is raised and the other of said support means is lowered, said rake support assembly is lowered and said teeth are moved from an open position to a closed position.

References Cited
UNITED STATES PATENTS 1,984,891  12/1934  Miick et al. _____ 210—162 X

FOREIGN PATENTS 754,083  8/1933  France.
365,153  12/1922  Germany.
174,598  7/1922  Great Britain.

REUBEN FRIEDMAN, *Primary Examiner.*

F. MEDLEY, *Assistant Examiner.*